L. S. LACHMAN.
COOKING UTENSIL.
APPLICATION FILED OCT. 28, 1905.
1,034,805.
Patented Aug. 6, 1912.
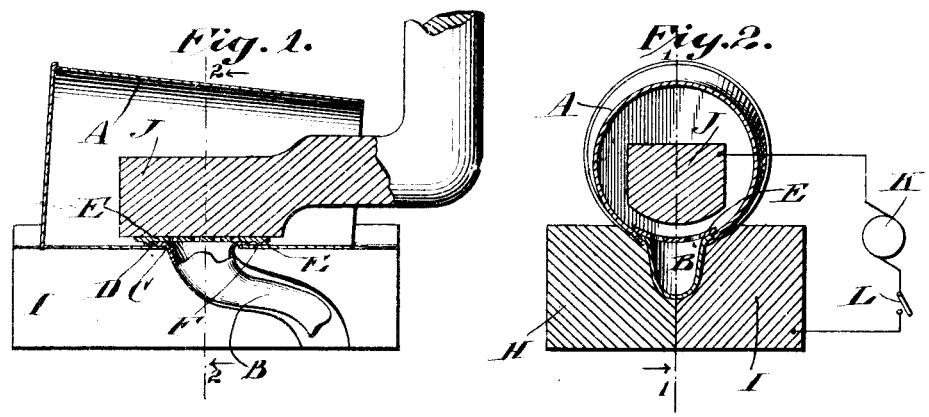
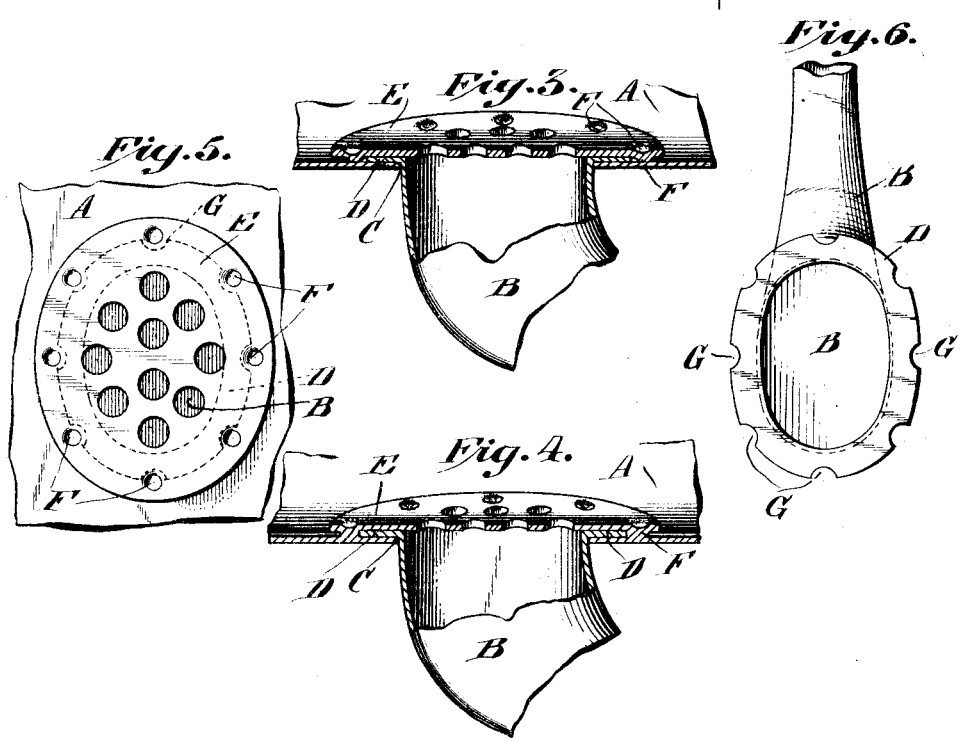
Attest:
Inventor.
Laurence S. Lachman
by Dickerson, Brown, Raegener & Binney
Attys

UNITED STATES PATENT OFFICE.

LAURENCE S. LACHMAN, OF NEW YORK, N. Y.

COOKING UTENSIL.

1,034,805.　　　Specification of Letters Patent.　　Patented Aug. 6, 1912.

Application filed October 28, 1905. Serial No. 284,905.

*To all whom it may concern:*

Be it known that I, LAURENCE S. LACHMAN, a citizen of the United States, and resident of the borough of Manhattan, city, county, and State of New York, have invented certain new and useful Improvements in Cooking Utensils, of which the following is a specification, accompanied by drawings.

This invention relates to different kinds of utensils, more particularly cooking utensils, such as coffee pots, teapots, pitchers, and all kinds of sheet metal utensils in which separate spouts are to be attached. It has heretofore been customary to attach these spouts to the sheet metal utensil by means of rivets and then enamel the utensil thereover, but the rivet heads then form unsightly places in the enamel and are apt to crack the enamel. Furthermore, it is difficult to obtain tight joints by means of rivets and the process is otherwise expensive and unsightly.

The objects of this invention are to do away with the difficulties experienced in this class of work and improve upon the construction of such utensils having spouts by electrically welding the spouts to the body of the utensils. By this means the unsightly appearance of riveting is avoided and a smooth unbroken surface is afforded for the subsequent enameling. By electrically welding the spouts to the utensils a much stronger union is afforded than by means of rivets or by means of interlocking connections of any kind, and the disadvantage and liability of corrosion are also avoided because the weld makes the spout an integral part of the body of the utensil and leaves practically no interstices for the collection of impurities and acids.

Further objects of the invention will hereinafter appear and to these ends the invention consists of utensils and methods of making same for carrying out the above objects embodying the features of construction, combinations of elements, and arrangement of parts having the general mode of operation substantially as hereinafter fully described and as claimed in this specification and as shown in the accompanying drawings, in which,—

Figure 1 is a horizontal vertical sectional view taken through the dies of a suitable welding machine and a coffee pot in position therein ready for welding the spout to the pot; Fig. 2 is a transverse sectional elevation of Fig. 1; Fig. 3 is an enlarged detail sectional longitudinal view taken through the portions of the pot which are in position to be welded, that is the base of the spout and the body of the pot; Fig. 4 is a view similar to Fig. 3 showing the parts after the welds have been completed; Fig. 5 is an inside face view of the perforated plate which goes over the hole in the body in which the spout is inserted; Fig. 6 is a rear view of the spout detached from the body of the pot showing the construction of the same.

In welding spouts to coffee pots, or spouts or projections to all kinds of utensils, the first condition encountered is the fact that the sheet metal both of the spout and of the body of the pot is very thin because utensils of this character are not made of very thick sheet metal. A process must therefore be devised which will either weld two very thin sheets of metal together, or else a scheme must be devised by means of which a thick sheet of metal may be utilized in the weld. Furthermore certain standard constructions are now in use in uniting the spout of a sheet metal coffee pot, for instance, to the body of the utensil, and in carrying out my invention I have devised a method of securing the spout to the body, which in no way changes the standard method, but is simply an addition thereto in connection with my process of electric welding, and I am enabled to use a thick sheet of metal welded to a thin sheet to secure the spout to the body.

I have discovered that in order to obtain the best results in welding a very thin sheet of metal like the body of a coffee pot to a substantially thicker sheet of metal, three or four gages thicker, it is preferable to provide points or projections forming contacts upon a thick sheet of metal, place these points or projections in direct contact with the surface of the thin sheet of metal, pass a current of electricity through the two sheets, thereby heating the points and heating the thin sheet of metal at the points of contact to a welding temperature and pressing the two sheets together, thereby incorporating the projections or points of contact within the thin sheet of metal and forming a perfect weld or autogenous and integral union therewith. The resistance of the thick metal is sufficient to enable the points to embed themselves in the heated thin metal, thereby making a perfect weld without projecting through on the other side of the thin sheet.

It has been proposed to weld two thick sheets or two thin sheets together by means of points or projections placed in contact one with the other. This has been found a satisfactory method for two comparatively thick sheets, but when the sheets of metal are very thin like the sheet metal of a coffee pot or other utensil, the resistance afforded to the current is so great that if it carries such welding points or projections not only are the points melted but portions of metal around the points are also melted to such an extent as to make a weak weld, which may be torn apart. On the other hand, it is difficult to weld points directly against the flat surface of a sheet of metal when both sheets are of substantial thickness because the points are melted, but there is not sufficient resistance in the thick sheet of metal to heat said metal all the way through and therefore a superficial weld is formed. Such thick metal is too conductive both for heat and electricity and on a plane surface there is little opportunity for such localized development of high temperature as is necessary for a point weld.

According to the present invention I am enabled to secure a firm, permanent, and complete union between pieces of thin metal by the use of a piece of thicker metal in the manner hereinafter set forth.

In the accompanying drawings, A represents the body of a thin sheet metal coffee pot or other utensil, and B represents the thin sheet metal spout for said utensil. In accordance with the usual practice, the body of the pot or utensil is provided with an aperture C, through which the spout B is thrust and the flange D on the spout then bears against the body of the pot around the inside of the aperture C as indicated in the figures. Ordinarily this flange D would be suitably riveted to the pot, or else interlocking connections would be formed between the metal of the body and the metallic flange D and perhaps rivets would be used in addition. In all such cases the rivets would project through the body of the pot and would show on the outside around the spout and would not be covered completely by the enamel. According to this present invention I use an additional sheet of metal E, which, as shown, is of substantial thickness and is several gages thicker than the metal A of the pot. This additional sheet E is provided with perforations through which the material may flow from the pot through the spout B and this plate E is of sufficient size to cover the hole C and extend around outside of the flange D of the spout. Upon the plate E I provide projections or contact points F which may be suitably formed in the metal of the plate E or pressed out of the same in any suitable manner. Preferably the flange D is provided with notches G which register with the projections F on the plate E and serve to center the spout in the aperture C.

After the spout has been placed in position in the aperture C, the pot is placed in a suitable split die, comprising the parts H and I, which are recessed to accommodate the spout and have a curved surface to accommodate the curve of the pot. The plate E is then placed in position over the hole C and the top die J is brought down upon said plate E. Electric connection is formed between the top and bottom dies through the coffee pot from the generator K, provided with the switch L. As the circuit is completed through the plate E and contacts F and body portion A of the pot, the dies are brought together and the sheets are pressed one upon the other, thereby forming a complete weld.

The plate E is of such thickness relatively to the body portion A of the pot that the weld does not show on the outside of the pot or shows to such a small extent that the enameling on the outside of the pot completely obliterates all traces of the weld. In other words, the thin metal of the body portion A of the pot is not fused or melted to such an extent as to weaken the weld, but is only heated and softened sufficiently to incorporate the contact points therein and form an autogenous and integral union therewith. It is to be observed that the notches G on the flange D of the spout substantially register with the points or projections F and touch the same when the plate E is placed in position so that in most cases the edges of the notches G will be welded to the plate E and to the body A of the pot, although this is not an essential feature of the invention. It does, however, make a stronger and more perfect union between the parts.

I have shown in the drawings and described a suitable method for making a utensil by securing the spout to the utensil by means of a special binding piece of metal, but the invention also contemplates directly welding the flange of the spout to the body of the utensil in any one of the different ways by means of which this can be accomplished, and the binding piece of thicker metal may be merely an annular ring.

The points or projections formed upon one of the sheets in carrying out this process are, as shown, widely separated and independent one from the other and the series of points is of substantially the same total effective contact area as the total area of the final welds formed at the points. According to this mode of operation the plates may be said to be electrically riveted at separated and independent points.

According to this invention the sheet metal utensil comprises in combination a spout and a binding piece of sheet metal electrically welded to the body of the utensil at a multiplicity of distinct and separate welds or unions formed at a multiplicity of contact spots between the opposing surfaces of the metal.

Obviously some features of this invention may be used without others and the invention may be embodied in widely varying forms.

Therefore, without limiting the invention to the precise steps of the process described or to an article such as shown in the drawings, I claim and desire to obtain Letters Patent for the following:

1. A thin sheet metal utensil provided with a spout having an upturned end forming a base, said spout held in position upon said utensil by means of a binding piece of metal surrounding and holding the base of said spout by means of a plurality of distinct and separate spots of integral union formed between the binding piece and the body of the utensil.

2. A thin sheet metal utensil provided with a spout having an upturned end forming a base, said spout held in position upon said utensil by means of a binding piece of metal surrounding and holding the base of said spout by means of a plurality of distinct and separate spots of integral union formed between the binding piece and the body of the utensil, said binding piece being of thicker metal than the body of the utensil to which the binding piece is welded.

3. A thin sheet metal utensil provided with a spout having an upturned end forming a base, said spout held in position upon said utensil by means of a binding piece of metal surrounding and holding the base of said spout by means of a plurality of distinct and separate spots of integral union formed between the binding piece and the body of the utensil, said binding piece being also perforated and arranged to cover the opening at the base of the spout.

4. A thin sheet metal utensil provided with a spout having an upturned end forming a base, said spout held in position upon said utensil by means of a binding piece of metal surrounding and holding the base of said spout by means of a plurality of distinct and separate spots of integral union formed between the binding piece and the body of the utensil, said base being provided with a series of notches which register with the spots of welded union.

In testimony whereof I have signed this specification in the presence of two subscribing witnesses.

LAURENCE S. LACHMAN.

Witnesses:
O. A. FOSTER,
A. L. O'BRIEN.